(12) United States Patent
Morley et al.

(10) Patent No.: US 9,342,239 B2
(45) Date of Patent: May 17, 2016

(54) VIRTUAL INTERFACE DEVICES

(75) Inventors: Jason Barrie Morley, Cambridge (GB); Andrew S. T. Lee, Ely (GB); Mark Boxall, Cambridge (GB); Andy Harter, Cambridge (GB)

(73) Assignee: RealVNC Ltd, Cambridge, Cambridgeshire (GB)

( * ) Notice: Subject to any disclaimer, the term of this patent is extended or adjusted under 35 U.S.C. 154(b) by 602 days.

(21) Appl. No.: 13/639,849

(22) PCT Filed: Apr. 20, 2011

(86) PCT No.: PCT/GB2011/050791
§ 371 (c)(1),
(2), (4) Date: Mar. 13, 2013

(87) PCT Pub. No.: WO2011/131989
PCT Pub. Date: Oct. 27, 2011

(65) Prior Publication Data
US 2013/0174079 A1 Jul. 4, 2013

(30) Foreign Application Priority Data

Apr. 21, 2010 (GB) .................................. 1006644.7

(51) Int. Cl.
*G06F 3/0488* (2013.01)
*G06F 3/023* (2006.01)

(52) U.S. Cl.
CPC .......... *G06F 3/04886* (2013.01); *G06F 3/0236* (2013.01)

(58) Field of Classification Search
CPC ............................ G06F 3/0488; G06F 3/04886
USPC ......................................................... 715/773
See application file for complete search history.

(56) References Cited

U.S. PATENT DOCUMENTS

| 7,249,325 B1 | 7/2007 | Donaldson |
| 2004/0030807 A1 | 2/2004 | Wessler et al. |

(Continued)

FOREIGN PATENT DOCUMENTS

| EP | 2068236 A1 | 6/2009 |
| EP | 2079010 A2 | 7/2009 |

(Continued)

OTHER PUBLICATIONS

Hildenbrand, Jerry, "Android Central's Keyboard Roundup," retrieved from the Internet at http://www.androidcentral.com/android-centrals-keyboard-roundup [retrieved on Nov. 28, 2012], Apr. 1, 2010.

(Continued)

*Primary Examiner* — Andrea Leggett
(74) *Attorney, Agent, or Firm* — Sheppard, Mullin, Richter & Hampton LLP

(57) ABSTRACT

A touch screen device configured to implement an auxiliary virtual keyboard on a touch screen, the device having touch/gesture sensing and image display functions, a processor, and memory storing control code and data defining the keyboard comprising a set of keys and a key layout map. The processor is configured to determine a size of a window in which the keyboard is to be displayed as a strip of keys; send instructions to display a partial view of the keyboard within the window so that a subset of keys are displayed, whereby the keyboard is scrollable in response to user input to alter the partial view to display a different subset of keys; receive touch data; map said touch data to a key using the key layout map to identify a touched key; and provide a response dependent on the identified touched key.

27 Claims, 14 Drawing Sheets

(56) References Cited

U.S. PATENT DOCUMENTS

| | | | |
|---|---|---|---|
| 2004/0066405 A1 | 4/2004 | Wessler et al. | |
| 2008/0024451 A1* | 1/2008 | Aimi et al. | 345/168 |
| 2008/0046496 A1 | 2/2008 | Kater | |
| 2008/0168368 A1 | 7/2008 | Louch et al. | |
| 2008/0284744 A1* | 11/2008 | Park et al. | 345/173 |
| 2008/0316183 A1* | 12/2008 | Westerman | G06F 3/0416 345/173 |
| 2009/0077464 A1 | 3/2009 | Goldsmith et al. | |
| 2009/0237728 A1 | 9/2009 | Yamamoto | |
| 2011/0258565 A1* | 10/2011 | Arscott | G06F 3/0416 715/763 |

FOREIGN PATENT DOCUMENTS

| | | |
|---|---|---|
| JP | 2001202173 | 7/2001 |
| JP | 2004531781 | 10/2004 |
| JP | 2005250949 | 9/2005 |
| JP | 2008305294 | 12/2008 |
| JP | 2009230253 | 10/2009 |
| WO | 0075765 A1 | 12/2000 |
| WO | 0208880 | 1/2002 |

OTHER PUBLICATIONS

International Application No. PCT/GB2011/050791, International Search Report and Written Opinion, Sep. 9, 2011.
Application No. GB1006644.7, Amended Search Report, Mar. 3, 2011.
Application No. GB1006644.7, Examination Report, Aug. 2, 2011.
Application No. GB1006644.7, Examination Report, Nov. 13, 2012.
Japanese Patent Application No. 2013-505545, Office Action, Feb. 3, 2015.
Japanese Patent Application No. 2013-505545, Office Action mailed Sep. 15, 2015.

* cited by examiner

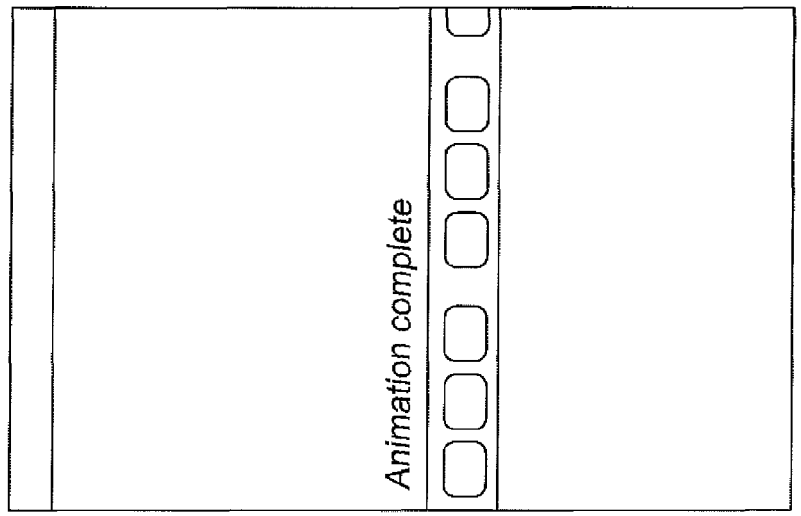
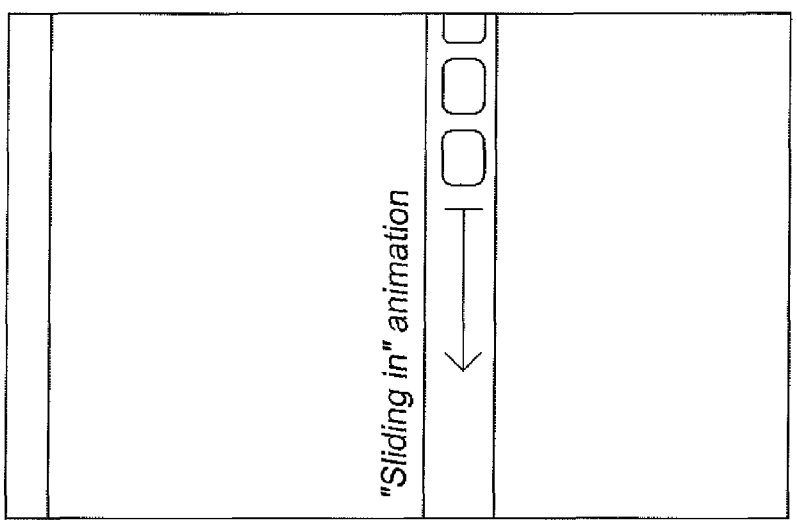
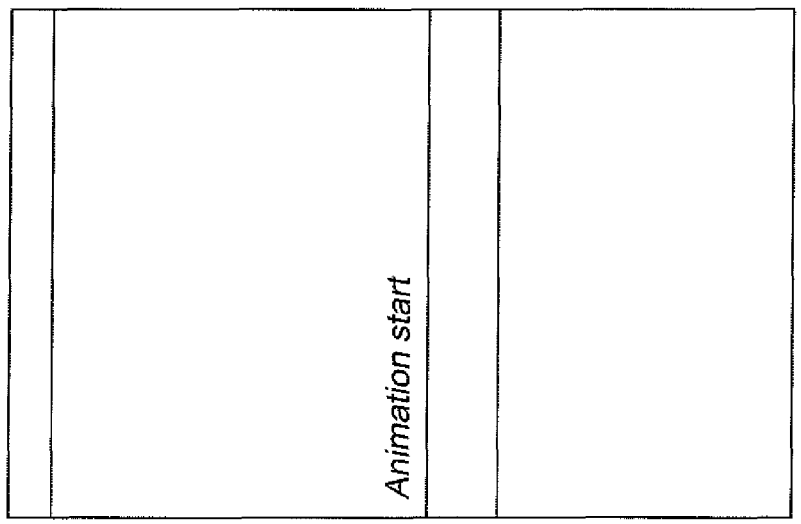
Fig 8c
Fig 8b
Fig 8a

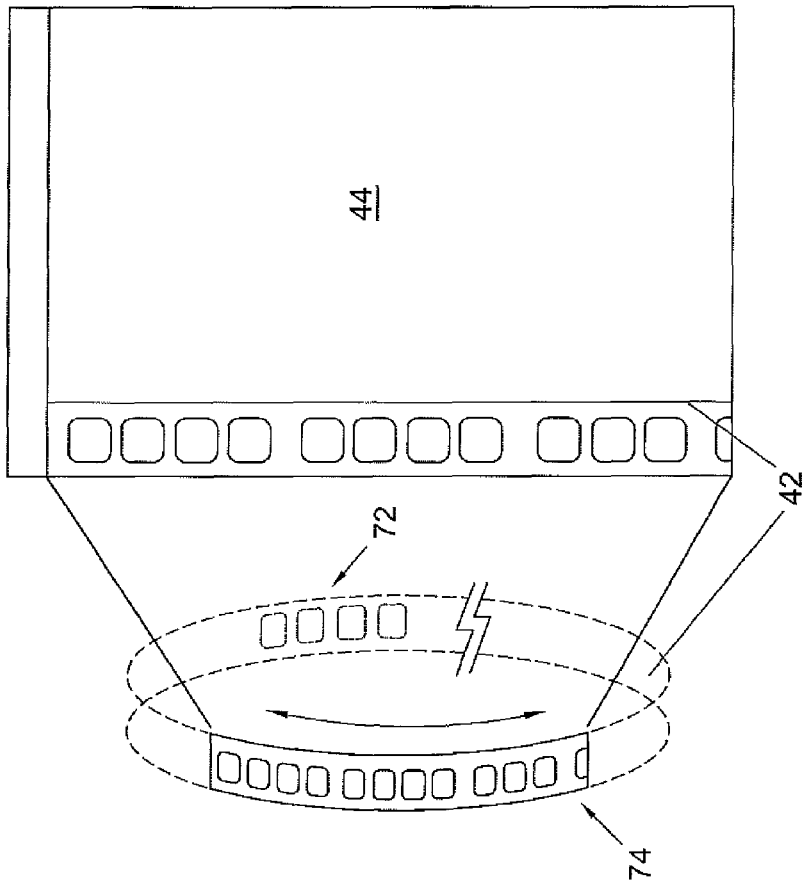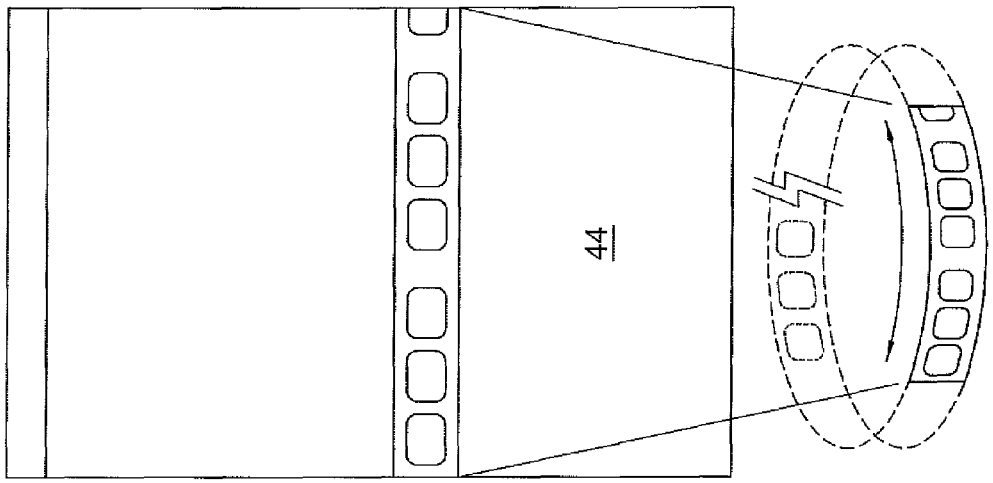

VIRTUAL INTERFACE DEVICES

CROSS-REFERENCE TO RELATED APPLICATIONS

This application is a continuation of International Application No. PCT/GB2011/050791 filed Apr. 20, 2011 and published as WO 2011/131989 A1, entitled "Virtual Keyboard with Strip of Auxiliary Keys," which claims priority to GB Patent Application Serial No. 1006644.7, filed Apr. 21, 2010, which applications are incorporated by reference herein.

FIELD OF THE INVENTION

This invention relates to improved interfaces, in particular for touch sensitive devices with relatively small screens such as mobile devices.

BACKGROUND TO THE INVENTION

Touch sensitive devices are becoming increasingly common. Examples include the iPad®, iPhone®, various tablet devices, mobile devices running the Google® Android® operating system, Symbian-based devices, Nokia mobile devices, and many more. Some of these devices use virtual keyboards in which a keyboard is displayed on the touch sensitive display to facilitate text entry. In the case of any iPhone® a "ABC" button and a "123" button are provided which have the effect of changing the displayed virtual keyboard between one showing the alphabet and one showing the numbers and symbols.

There are various devices which display additional buttons on the display alongside a keyboard. For example, US2009/0077464 (Goldsmith) describes a touch sensitive device in which a list of candidate words are presented on an interface to correct text input from a user. US2008/0046496 (Kater) describes a touch sensitive device having a touch screen with a key zone which comprises a main key area, number key area, and a function key area. EP2068236A1 (Sony) describes a graphical user interface on a smart phone which displays a plurality of icons. U.S. Pat. No. 7,249,325 (Donaldson) describes a graphical user interface having a tab display area with the tabs being indexed by alphabets and optionally arranged as a circular array.

Despite these known devices, there is a problem in displaying extended or modifier keys on such virtual keyboards of devices, in particular because of space limitations. There are potentially many such keys which might be needed including function keys, cursor keys (arrows), keys with special functions such as Control, Alt, Insert, Delete, Escape, as well as operating systems specific keys such as the "Apple" and "Windows" keys found on desktop keyboards. There is a need for improved user interfaces which make it easy for a user access such keys, in particular on the limited real estate of a mobile device touch screen.

SUMMARY OF THE INVENTION

According to a first aspect of the invention there is therefore provided a touch screen device configured to implement an auxiliary virtual keyboard on a touch screen of said device, wherein said device has an operating system configured to provide touch and gesture sensing and image display functions, the device comprising:
a processor coupled to a touch sensitive display screen and to non-volatile memory storing processor control code and data defining said auxiliary virtual keyboard comprising a set of auxiliary keys and an auxiliary key layout map of said auxiliary keys; wherein
said processor control code, when running on the processor is such that the processor is configured to:
receive a signal from said operating system that said auxiliary virtual keyboard is to be displayed on said touch screen;
determine a size of an auxiliary keyboard window in which said auxiliary virtual keyboard is to be displayed as a strip of auxiliary keys;
instruct said operating system to display a partial view of said auxiliary virtual keyboard within said window so that a subset of said auxiliary keys are displayed to a user, whereby said auxiliary virtual keyboard is scrollable in response to user input to alter the partial view of said auxiliary virtual keyboard to display a different subset of said auxiliary keys;
receive touch data from said operating system;
map said touch data to a key of said auxiliary keyboard using said auxiliary key layout map to identify a touched auxiliary key; and
provide a response to said operating system dependent on said identified touched auxiliary key.

The touch sensitive devices may be a mobile device, in particular one with a relatively small screen, e.g. phone, PDA, iPad® or the like. Alternatively, the touch sensitive device may be a surface computing device, i.e. a specialised graphical user interface in which traditional GUI elements such as a keyboard and mouse are replaced by the touch-sensitive screen. The touch sensitive device may be for use in automotive applications, e.g. route planning devices, or in industrial applications, e.g. as control panels for adjusting settings/functions for industrial processes.

The response provided to the operating system may be closely match the action of a physical hardware keyboard such as might be attached to a traditional desktop personal computer or laptop. Accordingly, in the present invention, the response provided to the operating system may be to generate events and key-codes corresponding to the touch data, i.e. to generate an associated key-code and at least one key event corresponding to each identified touched auxiliary key. For example, when a user touches (or presses) a displayed auxiliary key, the response may be to generate a key-code together with a key-down event where there is a single touch on the key or a key-repeat event where the touching of a key indicates a repeated action. When a user releases the displayed auxiliary key, the response may be to generate a key-code together with a key-up event.

Such events may be handled within the operating system by a hardware device driver and subsequently passed through an input-handling framework, which may optionally cause the operating system or focused application to perform some action, or inject a character or some other event.

The auxiliary keyboard window is sized to fit the device and the auxiliary keyboard is displayed in this window. However, it is not necessary to resize or reconfigure the auxiliary keyboard to fit the window because the auxiliary virtual keyboard is scrollable so that the subset of keys visible within the window may be changed by the user. In this way, the auxiliary virtual keyboard may be implemented on a variety of devices in different orientations (e.g. portrait or landscape) without the need to reconfigure the auxiliary keyboard for each device or orientation.

In some preferred implementations the auxiliary keyboard view is displayed alongside a virtual keyboard. A well-known characteristic of keyboards is that the labels on the keys and their meanings are static and drawn from a well known set that does not change as new applications are installed, documents opened or words edited. By contrast, US2009/0077464 describes displaying candidate words which will necessarily change for each use. Similarly, EP2068236A1 describes the display of icons which will also change for each configuration of applications installed on the device. The auxiliary keys of the present invention may thus comprise some or all of the non-standard alphanumeric keys which are present on a standard physical (hardware) keyboard. The auxiliary keys may thus comprise a combination of modifier keys (e.g. shift, caps lock), function keys (F1, F2 etc.) and positional keys (e.g. up and down arrows). The auxiliary keys may comprise some or all of the following: Shift, Control (Ctrl), Alt, Apple Key/Windows Key, Delete (Del), Escape (Esc), Tab, Insert (Ins), Cursor Up, Cursor Down, Cursor Left, Cursor Right, Home, End, Page Up, Page Down, F1 to F12, Scroll Lock, Caps Lock, Print Screen and Break.

In some embodiments the auxiliary keyboard may be displayed without an accompanying virtual keyboard, in particular to accompany a selection tool, such as a pointer for a mouse. When the auxiliary keyboard is displayed without the keyboard, the auxiliary keys may also comprise the standard alphanumeric keys. In some embodiments one or more of the auxiliary keys may perform a function of a combination of keys, such as Ctrl-Alt-Delete.

The auxiliary keys are arranged in a strip which may be linked to give the appearance of a continuous circular strip. In embodiments the auxiliary keyboard may be configured to snap to boundaries of one or more groups of preferably functionally related auxiliary keys or may be configured to allow the operating system to support snap function.

Said auxiliary keyboard may be scrollable in response to gesture data or other data input from the user that the partial view of the auxiliary keyboard is to be changed. The code may be further configured to receive such gesture or other input data from said operating system and responsive to said data adjust said partial view of said auxiliary keyboard. Alternatively, the operating system may be configured to adjust the partial view in response to the gesture or other data.

Said auxiliary keyboard may be implemented together with a virtual keyboard or without a virtual keyboard. In the latter case, the auxiliary keyboard may be implemented with a selection tool such as a mouse pointer, whereby the auxiliary keys may be used to control the selection tool.

The device may be linked to a remote computer or system (namely a remote device, itself running an operating system distinct from that of the touch sensitive device). The device may be configured to control said remote computer or system. Control of a remote system is achieved by means of a remote access protocol, which provides a mechanism for receiving a visual representation of the remote operating system on the touch screen device. Such visual representation of the remote system may be, but is not limited to, the contents of the screen actively displayed on the remote system. Examples of a remote access protocol include RFB, the Remote Framebuffer Protocol (as implemented in VNC and its derivatives), RDP, the Remote Desktop Protocol, and others.

The remote access protocol optionally provides a mechanism for sending events to the remote system, which might include, but are not limited to, pointer events and keyboard events. Accordingly, the remote access protcol may provide a key-code together with a key-down event, key-up event or key-repeat event corresponding to each identified touched key on the remote device. These provided key events closely map those of the physical hardware attached to the remote system.

In this context, the auxiliary virtual keyboard and auxiliary keys offer a means by which keys relevant to the remote system but not applicable to the local device may be displayed to the user. The keys presented on the auxiliary virtual keyboard may thus be considered redundant to the control of the touch sensitive device. In the context of a specific application (remote or otherwise) such keys may provide a one-touch method of performing complex key-combination operations specific to that application. For example, Ctrl+Alt+Delete (in the case of a PC with Microsoft Windows installed), Cmd+C (to copy on an OS X system).

The identified auxiliary key may be a modifier key and the processor control code may then be configured to modify a value of a key touched on the virtual keyboard in response to the identified touched modifier key. This modification may be achieved by receiving a value of the touch key of the virtual keyboard from the operating system, modifying this value dependent upon the identified touched modifier key and supplying a modified value of the touched virtual keyboard key back to the operating system. Additionally or alternatively, the identified touched modifier key may modify the appearance of the virtual keyboard by co-animating a secondary or dependent auxiliary keyboard. Such an accessory may comprise a subset of keys (standard keyboard keys or auxiliary keys) which are primarily associated with said identified touched modifier key. For example, if Ctrl is touched, the secondary auxiliary keyboard may display "C", "V" and "X" to ease the standard copy, paste and delete functions encapsulated by this combination of keys.

In some preferred embodiments the processor control code is configured to determine a dimension of the virtual keyboard and to adjust the size of the auxiliary keyboard view dependent upon this. Additionally or alternatively the size of the auxiliary keyboard view may be modified dependent on a detected orientation of the device (information which may be available from the operating system).

In some preferred embodiments the display of the auxiliary keyboard within the auxiliary keyboard view is co-animated with the appearance of the virtual keyboard. For example in embodiments the auxiliary virtual keyboard may comprise a linear strip which is animated to "fly in" to the window through which a portion of the auxiliary keyboard is viewed, to thereby impart to the user the concept that the auxiliary keyboard is mobile, more particularly slidable within the auxiliary keyboard view or window.

The auxiliary keyboard window may comprise a strip window. In some preferred embodiments the strip window is arranged adjacent the boundary of the virtual keyboard, for example above the virtual keyboard. Alternatively said strip window may be along an edge of said display screen. Said auxiliary virtual keyboard may be slidable backwards and forwards longitudinally within said strip window. The strip window may be horizontal or vertical.

In some preferred embodiments within a window the auxiliary keyboard keys are displayed such that at least one key at one or each end of the strip window is partially visible, again therefore cueing the user to understand that the virtual strip of auxiliary keys is moveable, more particularly slidable within the window. This may be achieved by modifying gaps between the keys (inter-key gaps) and/or by modifying the widths of the keys to ensure that a plurality of full keys and at least one partially visible key are displayed. The processor may be configured to implement the modification of the gap and/or key widths. For example, the code may be:

```
number_of_key_cells=floor (window_width/max_key_width);
if (extra_keys_to_left) number_of_key_cells+=0.5;
if (extra_keys_to_right) number_of_key_cells+=0.5;
key_cell_width=window_width/number_of_key_cells;
```

The key cell width may be smaller than the max_key_width to allow for the edge partial keys.

Alternatively, the processor may implement the following code:

fractional_key_width=0.4;
number_of_whole_keys=floor (window_width/max_key_width);
number_of_visible_widths=number_of_whole_keys+ 2*fractional_key_width;
key_cell_width=window_width/number_of_visible_widths;

In other words, the processor may implement processor control code which sets a gap at each end of the window which may or may not be filled with a partial key. The setting of these gaps determines the number of visible widths of keys in the window. In this way, the key size is not changed by the algorithm. The gap may be calculated as fractional key width multipled by key_cell_width.

In a related aspect there is provided a method of providing a virtual keyboard on a display view of touch sensitive device with a set of additional keys, the method comprising providing a window for displaying the additional keys in conjunction with the virtual keyboard, displaying a subset of the set of additional keys within the window as a keyboard accessory comprising a strip, said window displaying a partial view of said strip; scrolling said ribbon within said window in response to user touch on said display to alter said partial view and to alter said subset of displayed said keys and receiving user input from a touched displayed one of said additional keys.

Said auxiliary key may be a key to be pressed in conjunction with a key on said virtual keyboard, and said method may comprise modifying a key press of a key on said virtual keyboard responsive to said detected auxiliary key press.

Again in some preferred embodiments a partial image of an auxiliary key is visible at one end of the strip window. Also to cue a user into understanding that the linear strip of modifier keys is scrollable, in embodiments the strip of modifier keys is scrolled into the strip window when first displayed.

The invention still further provides a data carrier carrying processor control code for a touch screen device to implement an auxiliary virtual keyboard on a touch screen of said device, wherein said device has an operating system configured to provide touch and gesture sensing and image display functions, the device including: a processor coupled to a touch sensitive display screen and to non-volatile memory storing processor control code and data defining an image of a set of auxiliary keys and an auxiliary key layout map of said auxiliary keys; and wherein said processor control code comprises code configured to:

receive a signal from said operating system that an auxiliary virtual keyboard is to be displayed on said touch screen;

determine a size of an auxiliary keyboard window in which said auxiliary keyboard is to be displayed as a strip of auxiliary keys;

instruct said operating system to display a partial view of said auxiliary virtual keyboard within said window so that a subset of said auxiliary keys are displayed to a user, whereby said auxiliary virtual keyboard is scrollable in response to user input to alter the partial view of said auxiliary virtual keyboard to display a different subset of said auxiliary keys;

receive touch data from said operating system;

map said touch data to a key of said auxiliary keyboard using said auxiliary key layout map to identify a touched auxiliary key; and provide a response to said operating system dependent on said identified touched auxiliary key.

The invention further provides processor control code to implement the above-described systems and methods, for example on a general purpose computer system or on a digital signal processor (DSP). The code may be provided on a carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF DRAWINGS

The invention is diagrammatically illustrated, by way of example, by the following drawings, in which:

FIGS. 8a to 8c illustrate the animation of the auxiliary keyboard;

FIGS. 10a and 10b are schematic views of two further alternative keyboard accessories.

DETAILED DESCRIPTION OF DRAWINGS

Figure 1:
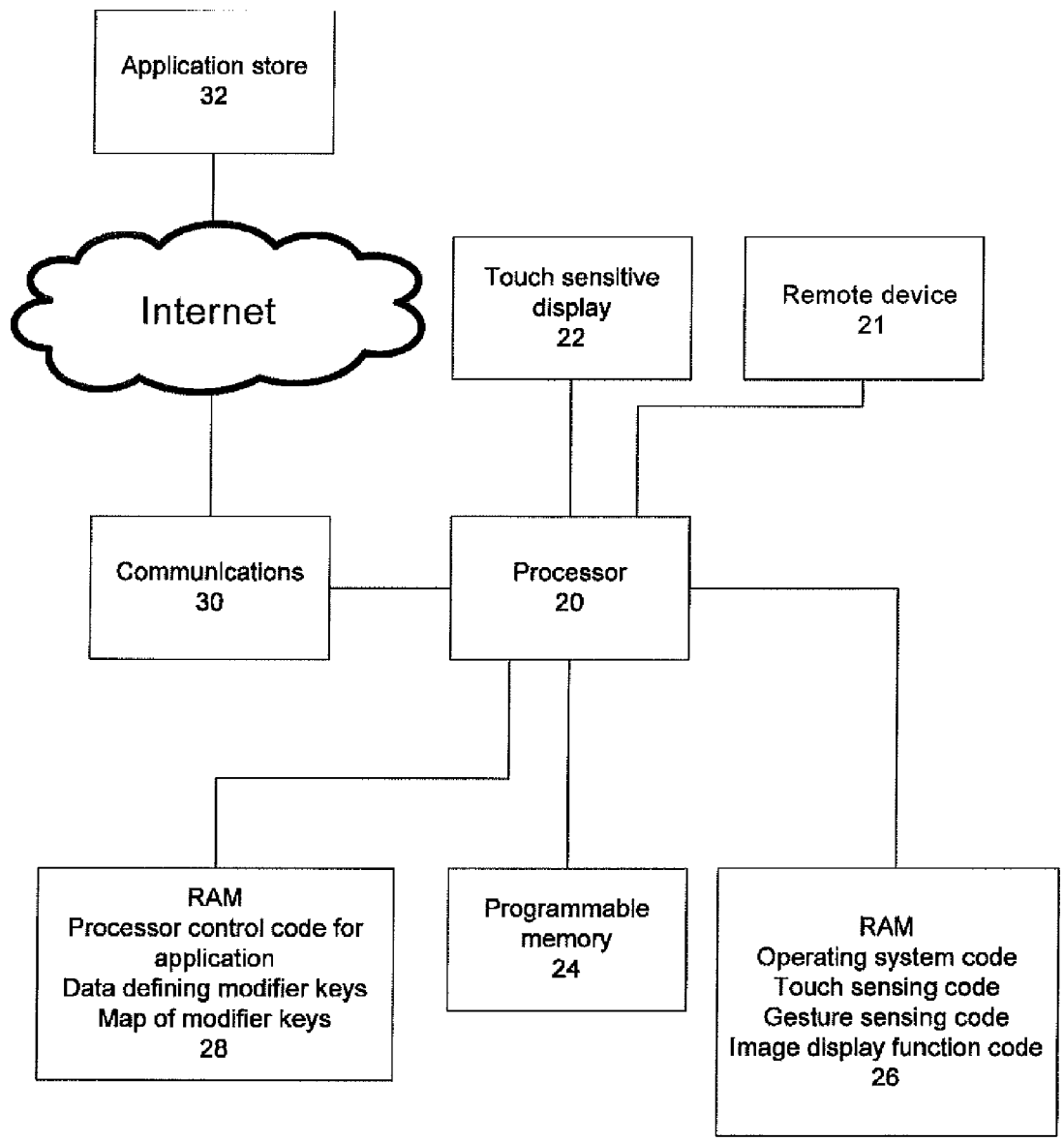
FIG. 1 is a schematic block diagram of the components of a touch sensitive device.

FIG. 1 shows the block elements of a touch screen device which is configured to implement an auxiliary virtual keyboard. The device comprises a processor 20 which is coupled to a touch sensitive display screen 22. The processor has non-volatile memory 26 storing the code for an operating system which is configured to provide touch sensing, gesture sensing and image display functions.

The processor 20 is connected through a communications interface 30 to other devices, for example an application store 32 which stores various applications having processor control code to implement applications on the device. These applications may be downloaded over the Internet. The downloaded application may be stored in non-volatile memory 28 which is shown separate from the non-volatile memory 26 storing the operating system code. It will be appreciated that these non-volatile memory components may be provided together. The downloaded application comprises processor control code for running the application on the device, data defining an image of a set of auxiliary keys and an auxiliary key layout map of auxiliary keys.

The processor is also optionally connected to a remote device 21 having an operating system. The remote device 21 may be a remote computer or system and the processor of the touch screen device may be configured to control said remote computer or system. In other words, actions on the touch sensitive display 22 connected to the processor 20 initiate responses in the remote device 21. By remote, it is meant a device which is physically separated from the touch screen device.

Figure 2:
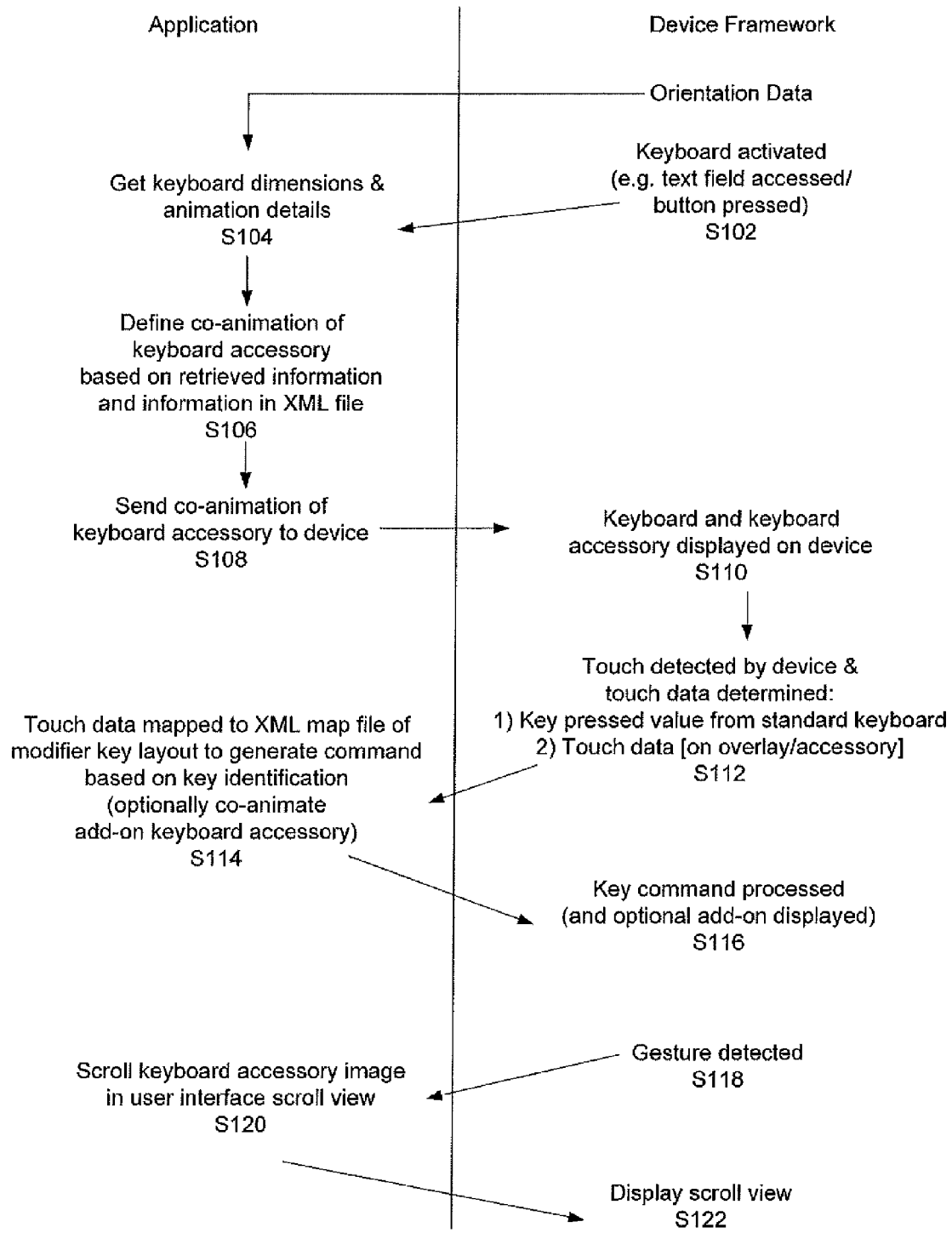
FIG. 2 is a flowchart illustrating the interaction between the framework of the operating system of the touch sensitive device and the auxiliary keyboard application.

As shown in FIG. 2, the processor control code from the application interacts with the framework (operating system) control code of the device to implement the auxiliary virtual keyboard alongside a keyboard. At step S102, the keyboard is activated by the operating system. The activation may be automatic, e.g. by a user accessing a text field on the device. Alternatively, the activation may be manual by a user pressing a button on the device. Alternatively, the activation may simply occur when the device is switched on. A signal is sent from the operating system that the keyboard is activated. At step S104, the application obtains details from the device, including orientation data (i.e. whether the device is in portrait or landscape mode), keyboard dimensions and the animation of the keyboard.

At step S106, the application uses the information gathered in the previous step together with the information in the XML file of the application to determine the co-animation of the auxiliary keyboard. The XML file contains the symbols and text that appear in the accessory. It is read before the accessory is materialised. The number, visual appearance and function of the accessory keys is determined completely by the XML file. The received data may be used in combination with this information to determine the size and orientation of the auxiliary keyboard view. At step S108, the co-animation of the auxiliary keyboard is sent to the device so that the operating system is instructed to display the keyboard and a partial view of the auxiliary keyboard view within the keyboard view.

The operating system detects a touch on the device and determines touch data at step S112. The touch data comprises a value indicating which key (if any) has been pressed on the keyboard together a value indicating which key(s) have been pressed on the auxiliary keyboard. Each key in the auxiliary keyboard may be pressed independently of each other and any standard keyboard keys. However, if the auxiliary key is a modifier key which modifies a value of a key on the accessory or on the standard keyboard, the touch data indicates the value of all keys depressed. Modifier keys do not necessarily need to be pressed at the same time as other keys, and the state change that they produce may be long-lasting, e.g. CapsLock or NumLock. At step S114, the application maps this received touch data to an XML map file showing the layout of the auxiliary keys to identify the auxiliary key(s) touched. At step S116 a key command based on the identified touched auxiliary key is sent back to the operating system for processing.

Due to size restrictions, only a partial view of the auxiliary keyboard is displayed. Accordingly, the auxiliary keyboard is moveable relative to the keyboard to allow access to other non-displayed keys. The auxiliary keyboard is moved by a detected gesture or other touch input on the screen. At step S118, the gesture (normally a sliding action to indicate scrolling) is detected by the operating system and gesture data defining the action is sent to the application. At step S120, the auxiliary keyboard is scrolled within the auxiliary keyboard view so that a different portion of the auxiliary keyboard is visible. The data defining the different view is sent back to the operating system.

Figure 3A:
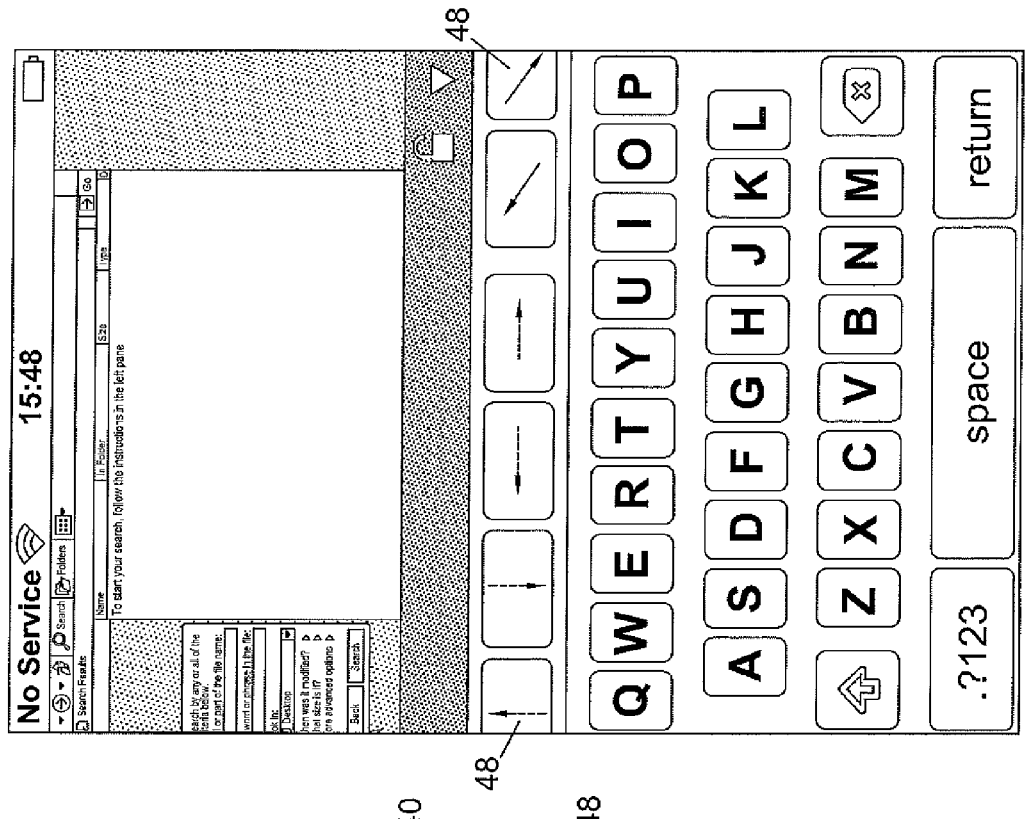
FIGS. 3a and 3b are screenshots showing a keyboard and a first partial view of an auxiliary keyboard displayed on an iPhone® in portrait and landscape mode respectively.

FIGS. 3a to 5d show how the auxiliary keyboard may be implemented on an iPhone®. In FIGS. 3a to 4b, the iPhone® has a standard keyboard 44 comprising the letters of the alphabet and a number button 50 for switching the standard keyboard to one comprising numbers and symbols. The auxiliary keyboard 42 is a linear strip of auxiliary keys 40 comprising shift, Ctrl, Alt, Del, cursor keys, function keys etc. A subset of the keys is displayed in a strip window above the keyboard 44. This strip window is the auxiliary keyboard view. There are two visual cues to indicate to a user that the auxiliary keyboard is scrollable to access further keys. In the animation (see FIGS. 8a to 8c) the linear strip of auxiliary keys "flies" into position above the keyboard. There are also partial keys 48 indicating that the auxiliary keyboard is scrollable. For example, as shown in FIG. 3a, the key next to the "Del" key is only partially shown indicating that the auxiliary keyboard may be scrolled to access keys to the right. Pressing on such a partially displayed key may trigger the scrolling action as an alternative to the standard scrolling gesture. Similarly, in FIG. 4a, the keys at both sides of the strip window are partial keys indicating that the auxiliary keyboard may be scrolled in both directions.

Figure 4A:
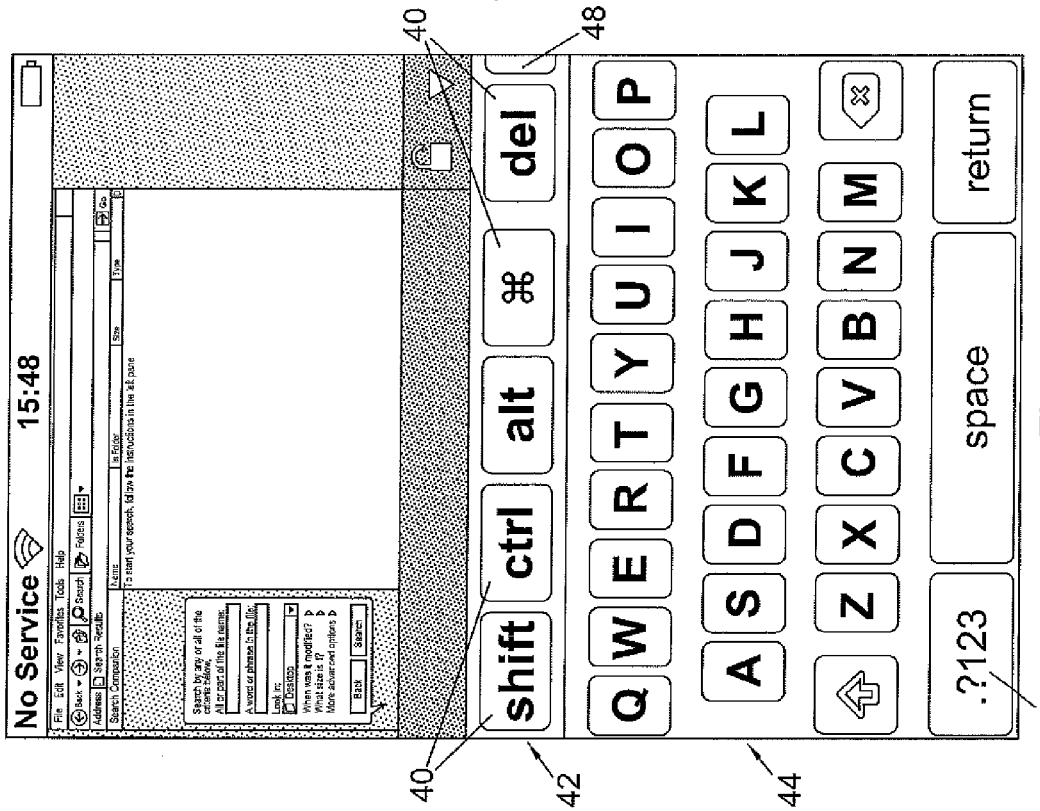
FIGS. 4a and 4b are screenshots showing a keyboard and a second partial view of an auxiliary keyboard displayed on an iPhone® in portrait and landscape mode respectively.
Figure 3B:
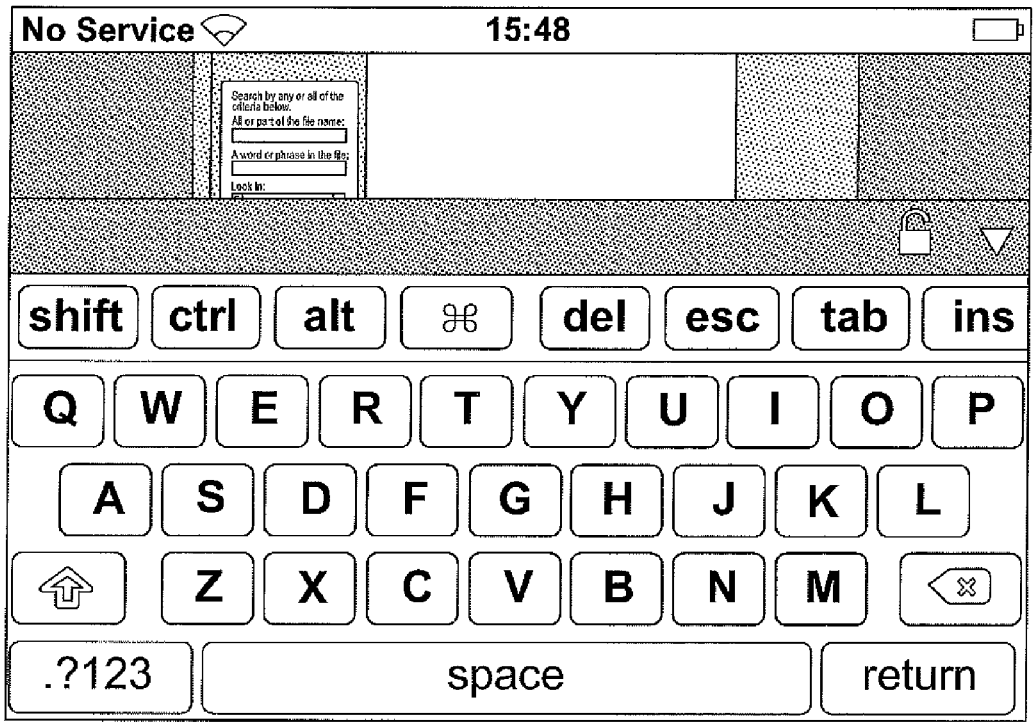
Figure 4B:
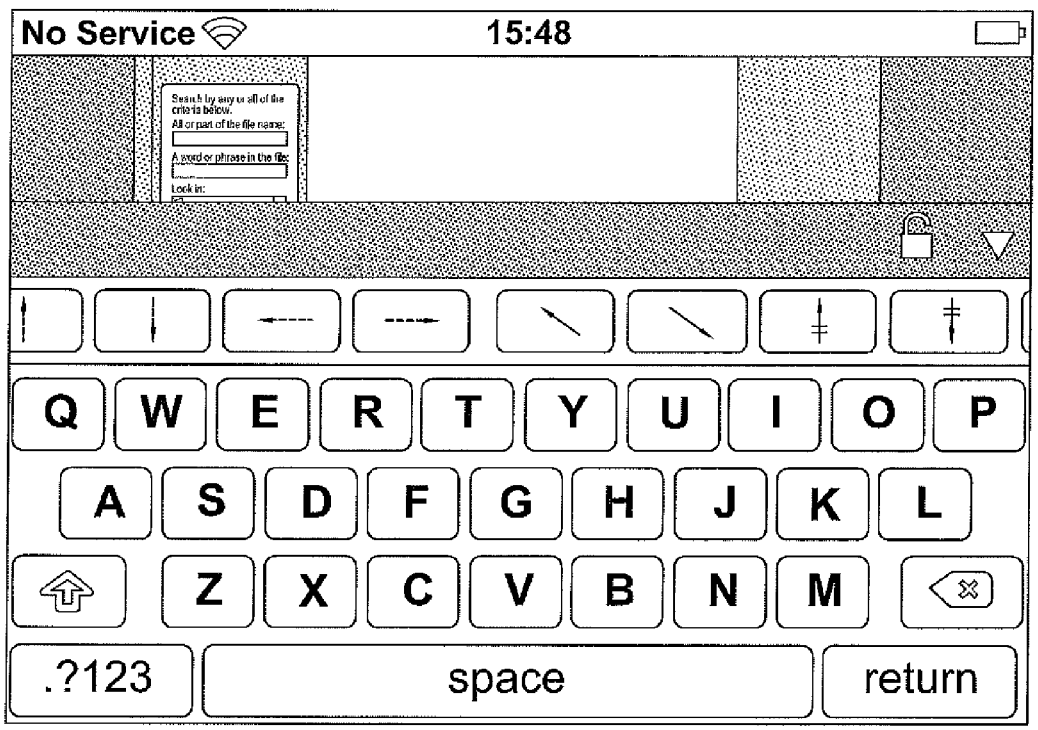
Figure 4C:
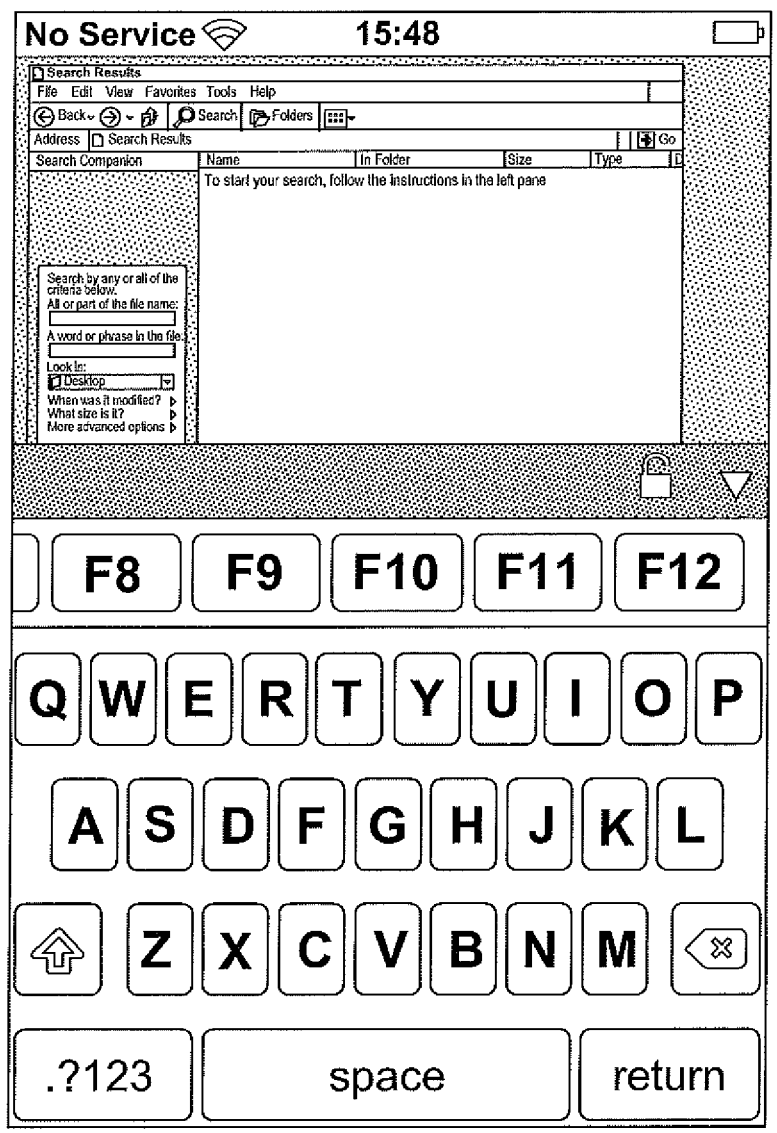
FIG. 4c is a screenshot showing a keyboard and a third partial view of an auxiliary keyboard displayed on an iPhone® in portrait mode.
Figure 5B:
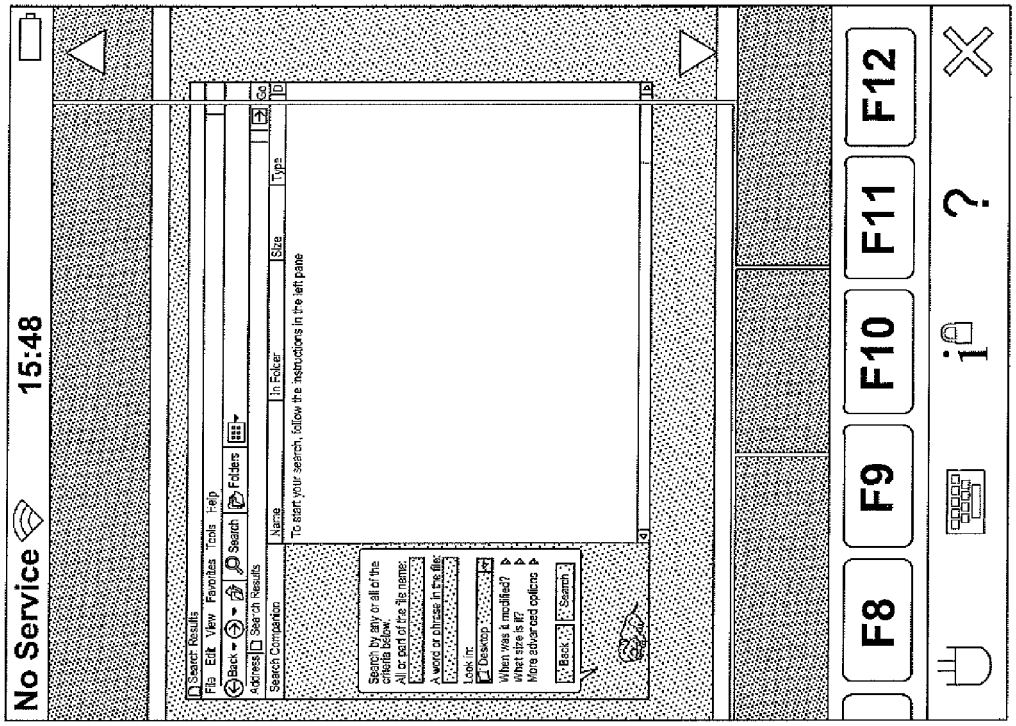
FIGS. 5a and 5b are screenshots showing two alternative partial views of an auxiliary keyboard displayed on an iPhone® in portrait mode.
Figure 5A:
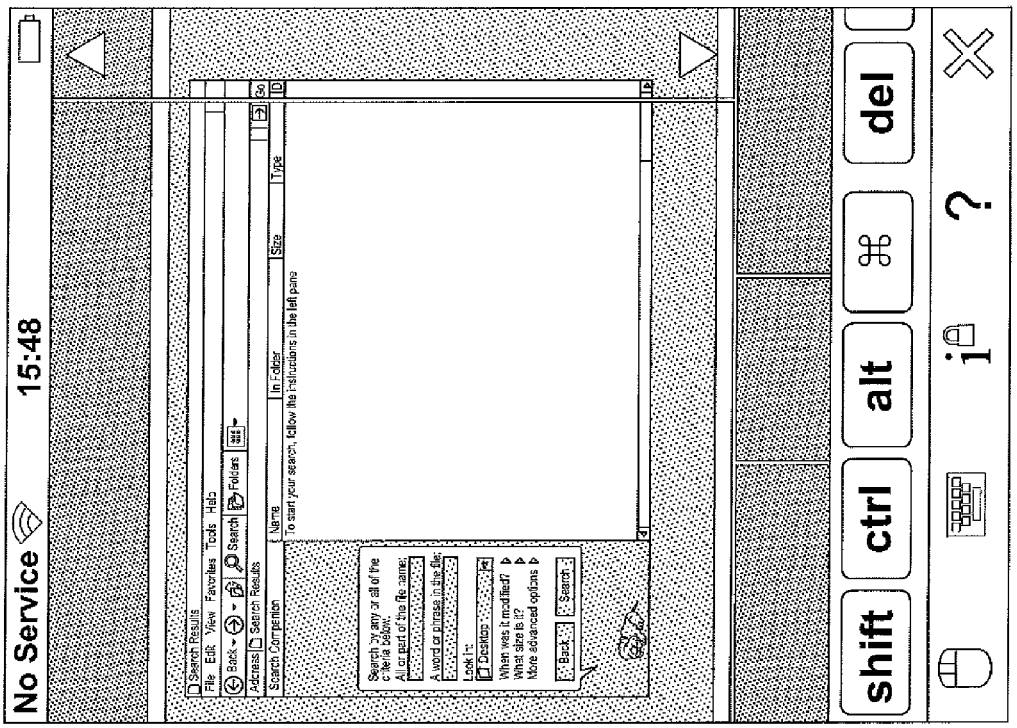
Figure 5C:
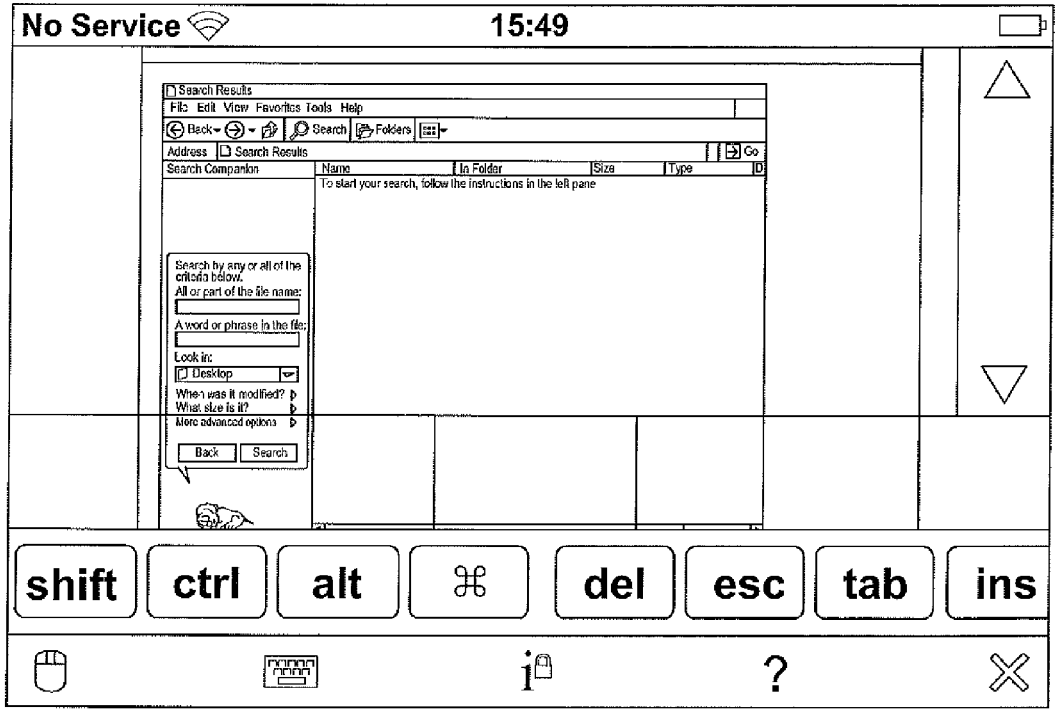
FIGS. 5c and 5d are screenshots showing two alternative partial views of an auxiliary keyboard displayed on an iPhone® in landscape mode.
Figure 5D:
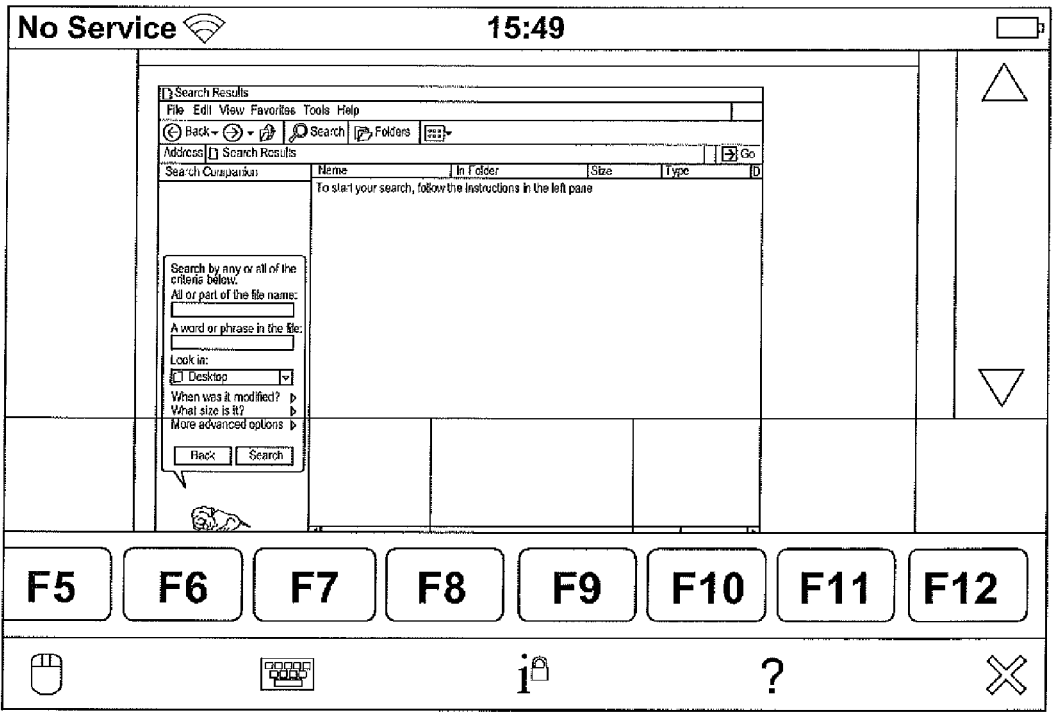

In the portrait modes of FIGS. 3a and 4a only four or five complete auxiliary keys are visible. Similarly, in FIG. 4c the last five complete auxiliary keys are shown. By contrast, in the landscape modes of FIGS. 3b and 4b showing similar sections of the auxiliary keyboard, seven complete keys are visible. The auxiliary keys are separated by gaps and as shown more clearly in FIGS. 3b and 4b, there are two sizes of gap. A larger gap indicates the subset into which the auxiliary keys are grouped. For example in FIG. 3b "shift, Ctrl Alt, apple key" for a group and in FIG. 4b "up, down, left and right arrows" form a group.

FIGS. 5a to 5d are a variation of the embodiment of FIGS. 3a to 4c in which the auxiliary keyboard is displayed without the keyboard. In this arrangement, the auxiliary keyboard is used to complement mouse functionality. The display and processing of the auxiliary keyboard would be similar to that of FIG. 2 with step S102 replaced by activation of the mouse controls and similar changes to replace co-animation/co-display of the keyboard and auxiliary keyboard with display of the auxiliary keyboard and mouse controls (e.g. mouse pointer). In this case, there is no touch data relating to a key on a standard keyboard and thus either the modified key value alone is processed or optionally used in combination with other on-screen accessories (e.g. the mouse pointer). As before, the auxiliary keyboard is displayed in a display accessory view in the form of a strip window so that only some of the auxiliary keys are visible. The strip window is located at the bottom of the display but may have a different location and orientation, e.g. running vertically down the side of the display.

Figure 6A:
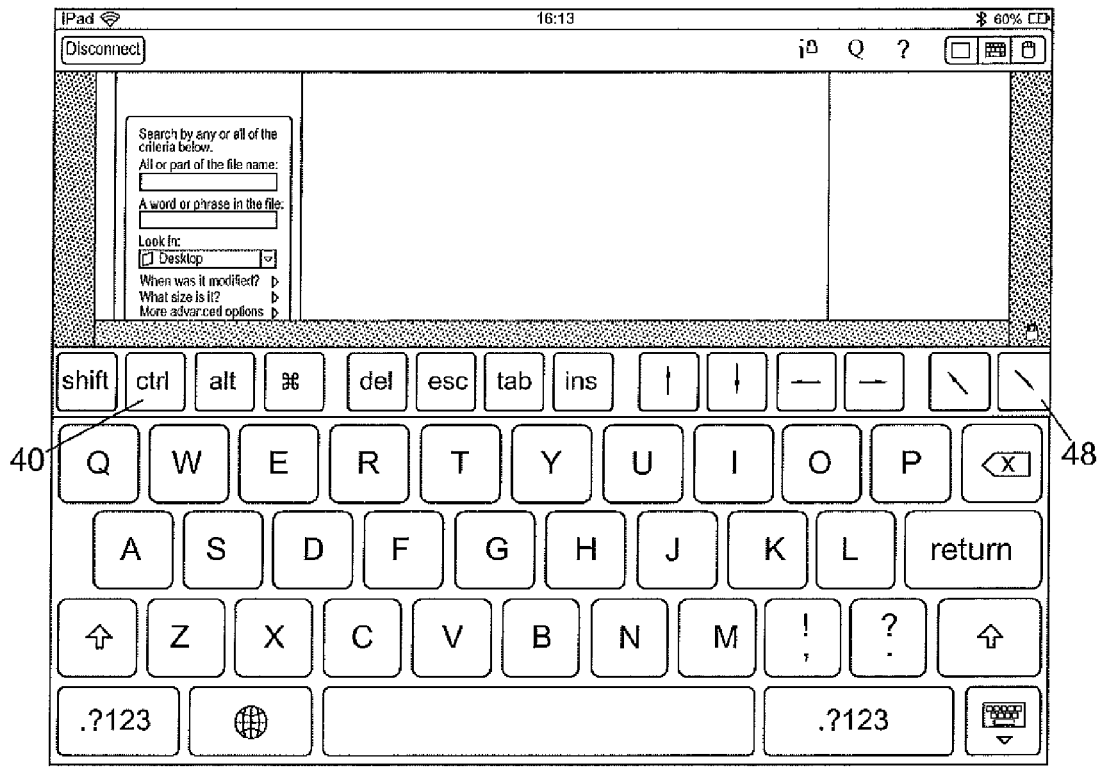
FIGS. 6a and 6c are screenshots showing a keyboard and a partial view of an auxiliary keyboard displayed on an iPad® in landscape and portrait mode respectively.
Figure 6B:
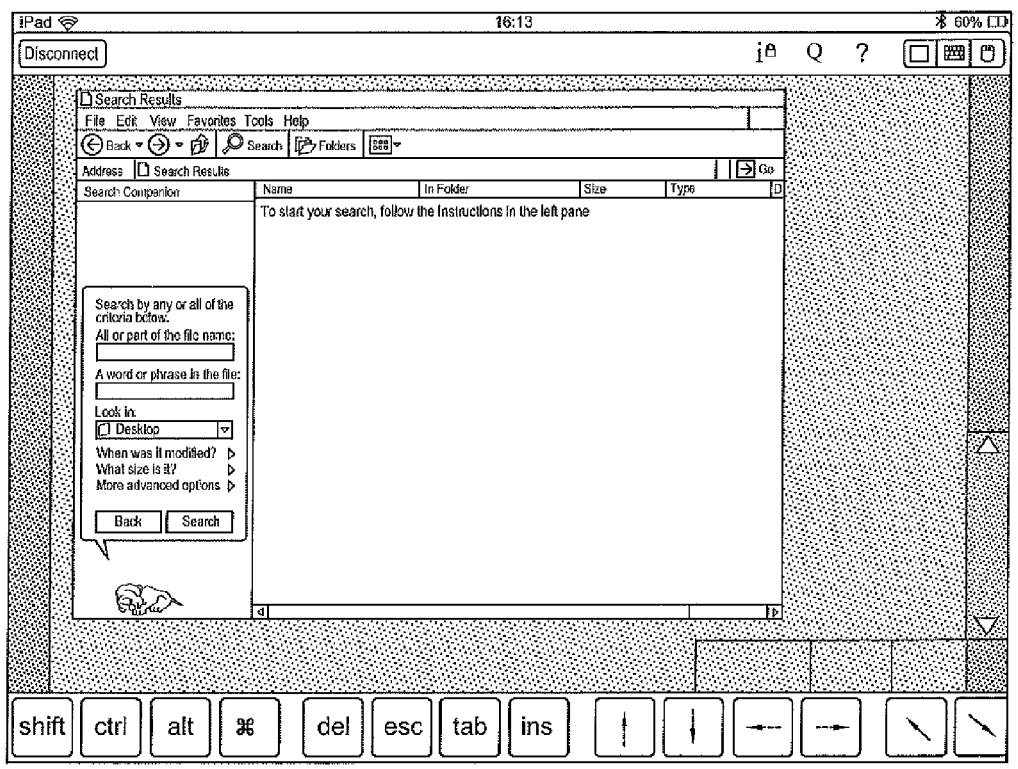
FIGS. 6b and 6d are screenshots showing a partial view of an auxiliary keyboard displayed on an iPad® in landscape and portrait mode respectively.
Figure 6D:
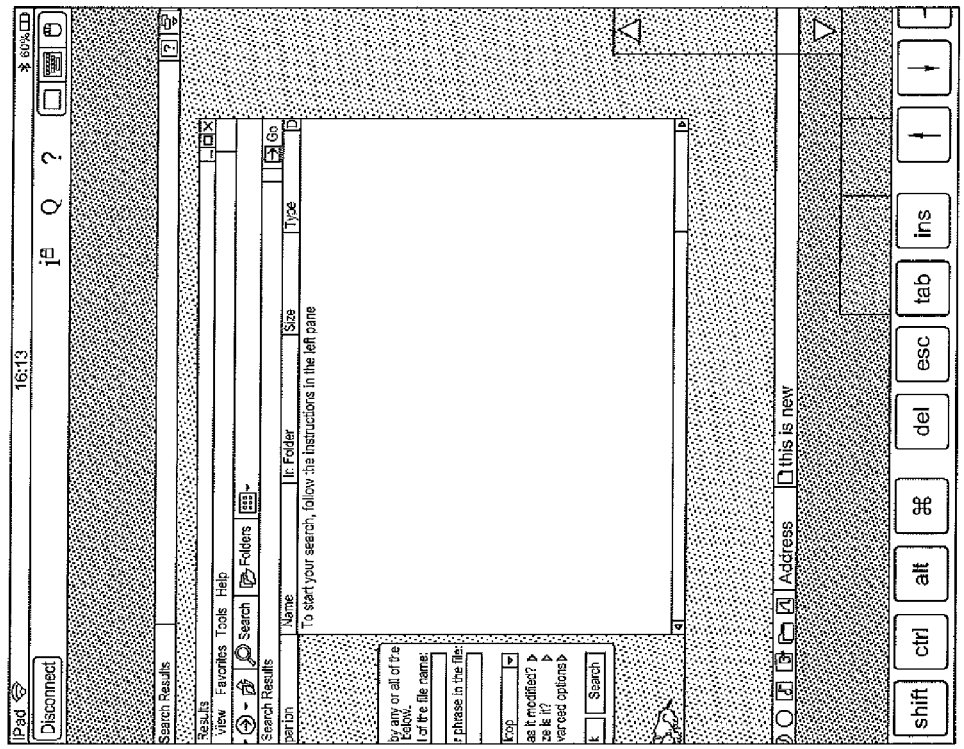
Figure 6C:
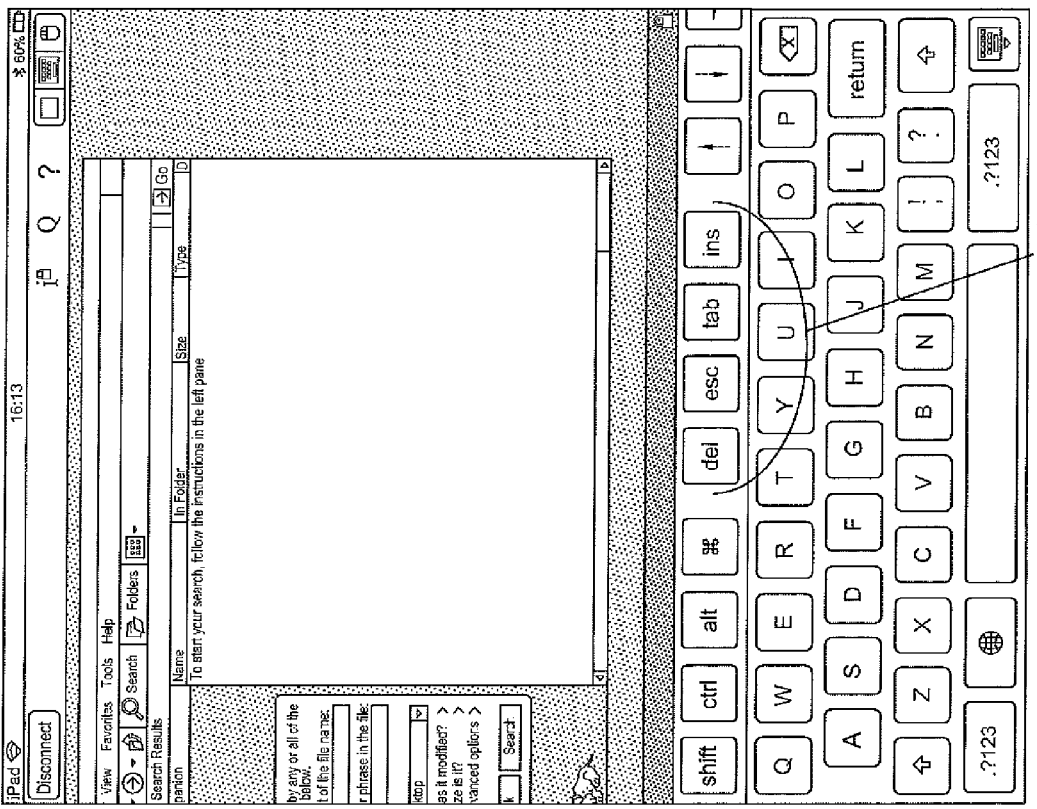

FIGS. 6a to 6d show the auxiliary keyboard displayed on an iPad®. In FIGS. 6a and 6c, the auxiliary keyboard is shown with the keyboard and in FIGS. 6b and 6d, the auxiliary keyboard is shown without the keyboard. The iPad® is a larger device than the iPhone®. Thus in landscape mode 13 complete auxiliary keys 40 are visible and in portrait mode 10 complete auxiliary keys 40 are visible. With more keys visible, the grouping of the keys into sets 54 is more clearly visible. Again a partial key 48 is shown a visual cue that there are more keys and that the auxiliary keyboard is scrollable.

Figure 7:
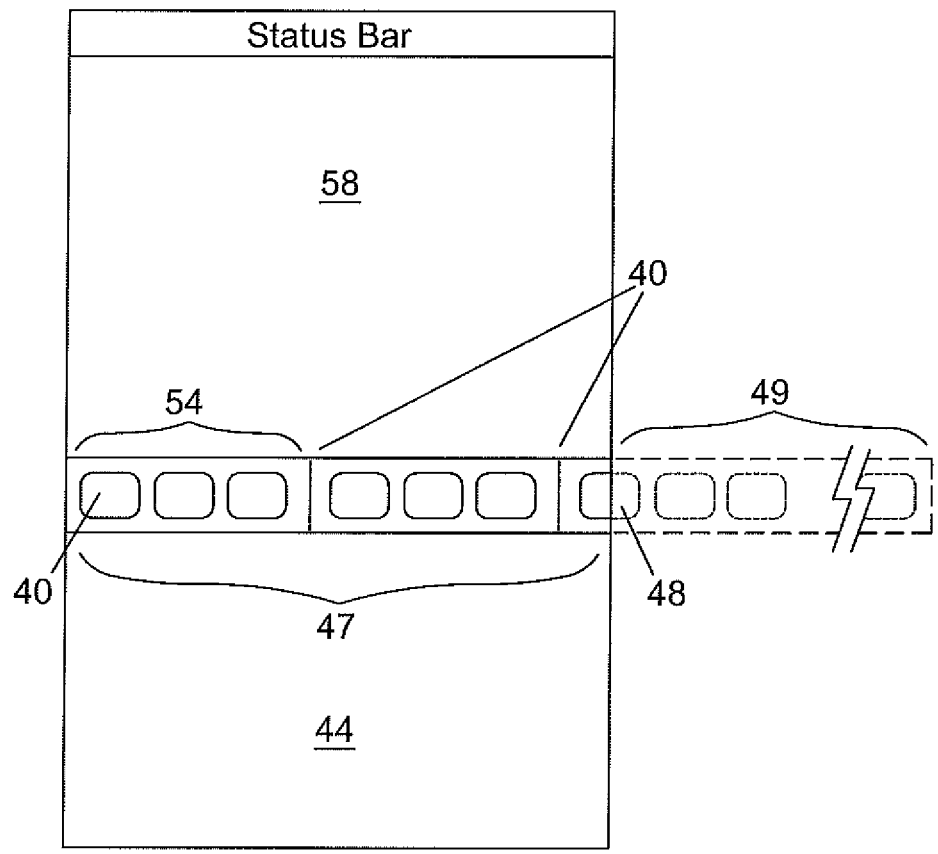
FIG. 7 is a schematic view in portrait mode of a mobile device having an auxiliary keyboard.

FIG. 7 is a schematic view illustrating the auxiliary keyboard on a generic mobile device. The auxiliary keyboard is displayed in a strip window 47 above the keyboard 44 on the display screen 58 of the device. The strip window is a scrolling container defined by the application but provided by the operating system. There is an application window frame above the strip window 47 and a status bar at the top of the device. The auxiliary keyboard comprises a plurality of keys 40 arranged in a linear strip. As shown six whole keys and one partial key 48 are visible within the strip window 47. The keys are arranged in groups 54 (in this case of three keys). They are markers 56 which control the scrolling of the auxiliary keyboard and ensure that the auxiliary keyboard snap locks to the start of the groups. There are several other keys 49 on the auxiliary keyboard which are not visible on the mobile device. As explained above the partial key 48 is a visual cue that these keys are available with scrolling.

FIGS. 8a to 8c illustrate another visual cue that the auxiliary keyboard is scrollable. When the auxiliary keyboard is first animated, e.g. following activation of the device itself or activation of a keyboard, as shown in FIG. 8a, none of the accessory is visible in the strip window. In FIG. 8b, the auxiliary keyboard slides into view in the direction indicated by the arrow. FIG. 8c shows the final stage when the animation is complete and the strip window is filled with keys on the auxiliary keyboard.

Figure 9B:
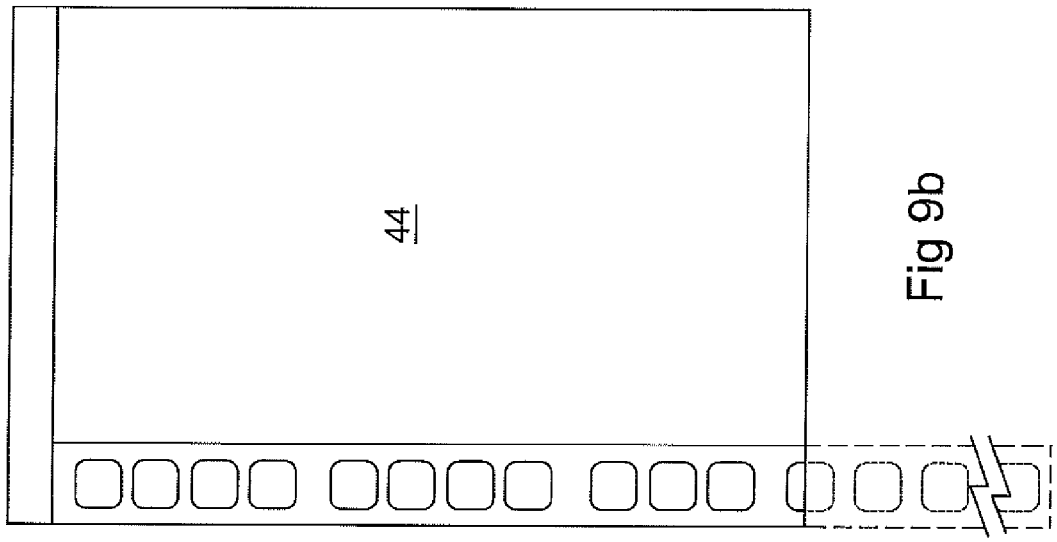
FIGS. 9a and 9b are schematic views of two alternative keyboard accessories.
Figure 9A:
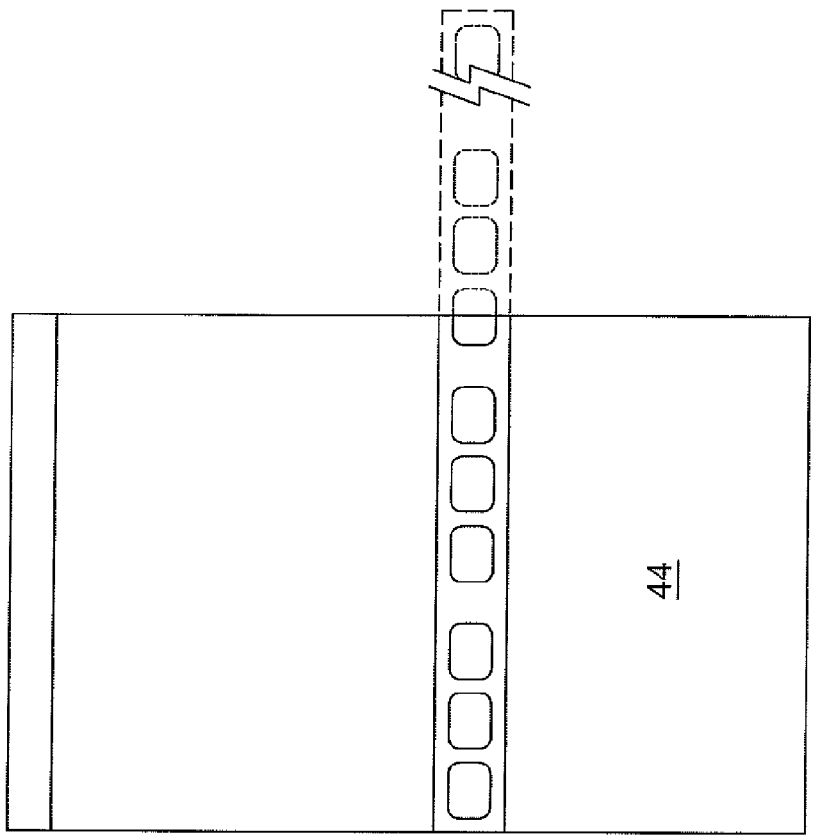

FIG. 9a is a schematic view of the auxiliary keyboard of FIG. 7. The auxiliary keyboard is positioned in a horizontal strip window above the keyboard 44. The strip window is approximately half-way up the display screen. FIG. 9b illustrates an alternative auxiliary keyboard which is displayed in a vertical strip window at one side of the keyboard 44. The strip window extends along the full length of the long side of the device and thus more keys are visible than in the arrangement shown in FIG. 9a. In both arrangements, the auxiliary keyboard is a linear strip of keys of which only a subset are visible at one time. The auxiliary keyboard is scrollable backwards and forwards along its long axis (i.e. longitudinally) to change the partial view of the auxiliary keyboard and hence change the subset of keys which are visible of the display screen.

In the arrangement of FIGS. 10a and 10b, the linear strip of keys of auxiliary keyboard 42 is a continuous loop. As in FIGS. 9a and 9b, only a subset of keys 74 are visible in the strip window on the display screen with more keys 72 available but out of sight and forming an off-screen loop section. The auxiliary keyboard is also scrollable backwards and forwards along its long axis (i.e. longitudinally) to change the partial view of the auxiliary keyboard. However, in contrast to the arrangement of FIGS. 9a and 9b, there are no ends to the linear strip and thus it is possible to change the partial view by scrolling in one direction only. In FIG. 10a, the strip window is arranged horizontally and in FIG. 10b, the strip window is arranged vertically.

Figure 11A:
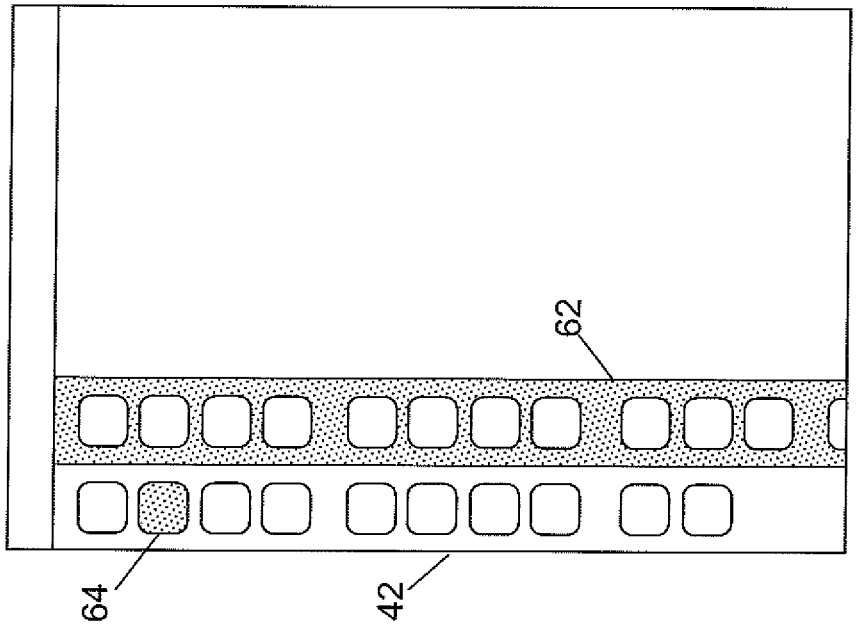
FIGS. 11a and 11b are schematic plan views of two alternative second keyboard accessories.
Figure 11B:
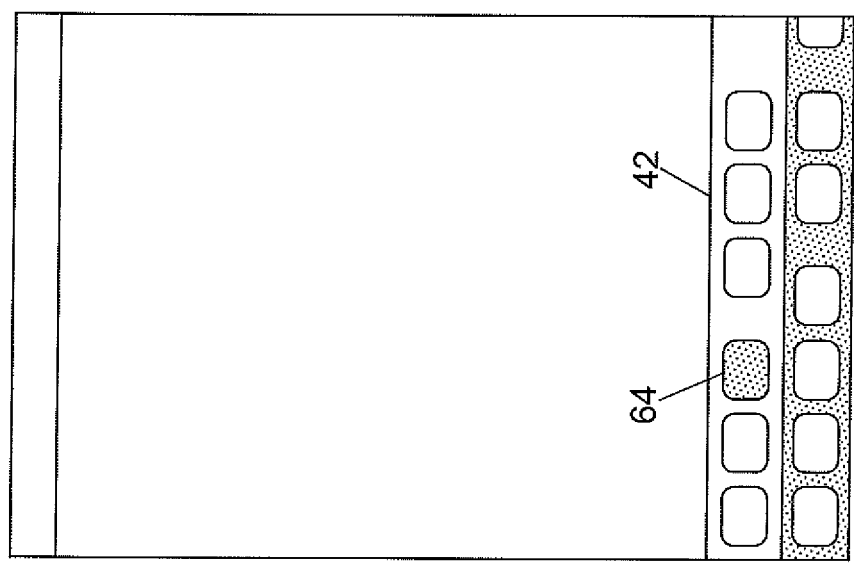

FIGS. 11a and 11b show the use of a secondary auxiliary keyboard 62 without a keyboard. In both Figures, activation of a particular key 64 on the primary auxiliary keyboard 42 (which may be any of the keyboard accessories described above, e.g. a linear strip or loop), triggers animation of the secondary auxiliary keyboard. The secondary auxiliary keyboard displays keys most commonly associated with the activated key (e.g. if Ctrl is pressed, the secondary auxiliary keyboard may display "C", "V", "X". In FIG. 11a, the secondary auxiliary keyboard is displayed in a horizontal strip window below the auxiliary keyboard. In FIG. 11 b, the secondary auxiliary keyboard is displayed in a vertical strip window adjacent the vertical auxiliary keyboard.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A touch screen device configured to implement an auxiliary virtual keyboard, the device comprising:
   a touch sensitive display screen;
   a touch screen operating system configured to provide touch and gesture sensing and image display functions on said touch sensitive display screen; and
   a processor coupled to the touch sensitive display screen and to non-volatile memory storing processor control code and data defining said auxiliary virtual keyboard comprising a set of auxiliary keys and an auxiliary key layout map of said auxiliary keys;
   wherein said touch screen device is connected to a remote device having a remote device operating system which is distinct from the touch screen operating system, and
   further wherein said processor control code, when running on the processor is such that the processor is configured to:
      receive a signal from said touch screen operating system that said auxiliary virtual keyboard is to be displayed on said touch sensitive display screen;
      determine a size of an auxiliary keyboard window in which said auxiliary virtual keyboard is to be displayed as a strip of auxiliary keys;
      instruct said touch screen operating system to display a partial view of said auxiliary virtual keyboard within said window so that a subset of said auxiliary keys are displayed to a user on said touch sensitive display screen, whereby said auxiliary virtual keyboard is scrollable in response to user input to alter the partial view of said auxiliary virtual keyboard to display a different subset of said auxiliary keys;
      receive touch data from said touch screen operating system;
      map said touch data to a key of said auxiliary keyboard using said auxiliary key layout map to identify a touched auxiliary key; and
      provide a response to said remote device operating system dependent on said identified touched auxiliary key.

2. The touch screen device according to claim 1, wherein the response provided to the remote device operating system comprises generating an associated key-code and at least one key event corresponding to each identified touched auxiliary key.

3. The touch screen device according to claim 2, wherein the key event is one or more of a key-down event, a key-repeat event or a key-up event.

4. The touch screen device as claimed in claim 1 wherein said processor is further configured to modify an appearance of said virtual keyboard by co-animating a secondary auxiliary keyboard.

5. The touch screen device as claimed in claim 1 wherein said auxiliary keyboard window comprises a strip window along an edge of said display screen and wherein said auxiliary virtual keyboard is slidable longitudinally within said strip window.

6. The touch screen device as claimed in claim 5 wherein said processor control code is configured to provide markers defining groups of auxiliary keys within said auxiliary keyboard and to instruct said operating system to snap to said one or more groups of said auxiliary keys.

7. The touch screen device as claimed in claim 1 wherein said code to determine a size of an auxiliary keyboard window is configured such that at one or more edges of said auxiliary keyboard window only a portion of a said auxiliary key is displayed.

8. The touch screen device as claimed in claim 1 wherein said auxiliary keys comprise at least one key configured to perform the function of a combination of keys, wherein the combined keys comprise two or more keys selected from the group comprising tab, shift, Control, Escape, Alt, a function key, Insert, Delete, a cursor/arrow key, an Apple key, a Windows key, and an alphanumeric key.

9. The touch screen device as claimed in claim 1 wherein said linear strip of auxiliary keys forms a continuous loop which is scrollable within said auxiliary keyboard window.

10. The touch screen device as claimed in claim 1 wherein said auxiliary keyboard is implemented together with a virtual keyboard.

11. The touch screen device as claimed claim 10 wherein said code comprises code to determine a dimension of said virtual keyboard, and wherein said code to determine a size of said auxiliary keyboard view comprises code to adjust said size dependent on said dimension of said virtual keyboard.

12. The touch screen device as claimed in claim 11 wherein said code to determine a dimension of said virtual keyboard comprises code to receive from said operating system data defining an orientation of said device.

13. The touch screen device as claimed in claim 10 wherein said identified touched auxiliary key is a modifier key and said code to provide said response is configured to modify a value of a key touched on said virtual keyboard responsive to said identified touched modifier key.

14. The touch screen device as claimed in claim 13 wherein said code to modify said response comprises code to receive a value of a touched key of said virtual keyboard from said touch screen operating system and code to provide a modified value of said touched key back to said remote device operating system dependent on said identified touched modified key.

15. The touch screen device as claimed in claim 10 wherein said code to instruct said touch screen operating system to display a partial view of said auxiliary keyboard is configured to co-animate appearance of said auxiliary keyboard with said virtual keyboard on said display screen.

16. The touch screen device as claimed in claim 10 wherein said auxiliary keyboard view comprises a strip window adjacent a boundary of said virtual keyboard.

17. The touch screen device as claimed in claim 1, wherein said processor control code is further configured to
 implement a remote access protocol which provides a mechanism for receiving a visual representation of the remote operating system on the touch screen device.

18. The touch screen device as claimed in claim 1, wherein said processor control code is further configured to provide a response in the form of a key-code together with a key-down event, key-up event or key-repeat event corresponding to each identified touched key on the remote device.

19. The touch screen device of claim 1, wherein the auxiliary keys are keys which are relevant only to the remote device.

20. The touch screen device of claim 1, wherein the auxiliary keys are keys which are redundant to control of the touch screen device.

21. A method of providing a virtual keyboard with a set of auxiliary keys on a display view of touch sensitive device having a touch device operating system, wherein said touch sensitive device is connected to a remote device having a remote device operating system which is distinct from the touch device operating system, the method comprising:
 providing, using said touch device operating system a window for displaying the auxiliary keys in conjunction with the virtual keyboard on the display view of the touch sensitive device;
 displaying a subset of the set of auxiliary keys within the window as a keyboard accessory comprising a strip, said window displaying a partial view of said strip;
 scrolling said strip within said window in response to user touch on said display to alter said partial view and to alter said subset of displayed said keys;
 receiving user input from a touched displayed one of said auxiliary keys at said touch device operating system; and
 providing a response from said touch device operating system to said remote device operating system dependent on said identified touched auxiliary key, wherein said response corresponds to control of said remote device.

22. The method according to claim 21, wherein said displaying further comprising displaying a visual cue that said strip is scrollable.

23. The method according to claim 21, wherein said auxiliary key comprises a key to be pressed in conjunction with a key on said virtual keyboard, and wherein said method comprises modifying a key press of a key on said virtual keyboard responsive to said detected auxiliary key press.

24. The method as claimed in claim 21 wherein said displaying of said subset of said auxiliary keys comprises arranging said auxiliary keys such that an edge of said strip window passes through a said auxiliary key to display a partial image of a said auxiliary key.

25. The method as claimed in claim 21 wherein said displaying of said auxiliary keys comprises scrolling said strip of said auxiliary keys into said window when said auxiliary keys are first displayed in said touch screen.

26. The method of claim 21, wherein the auxiliary keys are keys which are relevant to control of the remote device and are redundant to control of the touch screen device.

27. A data carrier carrying processor control code for a touch screen device to implement an auxiliary virtual keyboard on a touch sensitive display screen of said touch screen device, wherein said touch screen device has a touch screen operating system configured to provide touch and gesture sensing and image display functions on said touch sensitive display screen, and wherein said touch screen device is connected to a remote device having a remote device operating system, the touch screen device including: a processor coupled to said touch sensitive display screen and to non-volatile memory storing processor control code and data defining an image of a set of auxiliary keys and an auxiliary key layout map of said auxiliary keys; and
 wherein said processor control code comprises code configured to:
  receive a signal from said touch screen operating system that an auxiliary virtual keyboard is to be displayed on said touch sensitive display screen;

determine a size of an auxiliary keyboard window on said touch sensitive display screen in which said auxiliary keyboard is to be displayed as a strip of auxiliary keys;

instruct said touch screen operating system to display a partial view of said auxiliary virtual keyboard within said window so that a subset of said auxiliary keys are displayed to a user, whereby said auxiliary virtual keyboard is scrollable in response to user input to alter the partial view of said auxiliary virtual keyboard to display a different subset of said auxiliary keys;

receive touch data from said touch screen operating system;

map said touch data to a key of said auxiliary keyboard using said auxiliary key layout map to identify a touched auxiliary key; and provide a response to said remote device operating system dependent on said identified touched auxiliary key.

\* \* \* \* \*